(12) United States Patent
Arnett et al.

(10) Patent No.: US 7,971,851 B2
(45) Date of Patent: Jul. 5, 2011

(54) TORQUE BALANCE SERVO INCLUDING ELECTROMAGNETIC FORCE BIAS MECHANISM

(75) Inventors: Eric Arnett, Granger, IN (US); Steve Emo, South Bend, IN (US)

(73) Assignee: Honeywell International Inc., Morristown, NJ (US)

( * ) Notice: Subject to any disclaimer, the term of this patent is extended or adjusted under 35 U.S.C. 154(b) by 735 days.

(21) Appl. No.: 12/033,582

(22) Filed: Feb. 19, 2008

(65) Prior Publication Data
US 2009/0206289 A1 Aug. 20, 2009

(51) Int. Cl.
*F16K 31/02* (2006.01)
(52) U.S. Cl. .................... 251/129.2; 251/129.15
(58) Field of Classification Search ............. 251/129.2, 251/129.15
See application file for complete search history.

(56) References Cited

U.S. PATENT DOCUMENTS

| | | | | |
|---|---|---|---|---|
| 1,993,544 A * | 3/1935 | Fleischel | ...................... | 74/336.5 |
| 2,764,868 A * | 10/1956 | Bottoms et al. | ........... | 60/39.281 |
| 2,968,347 A * | 1/1961 | Farkas | ...................... | 60/39.281 |
| 3,045,983 A * | 7/1962 | Best | .................... | 165/235 |
| 3,055,383 A * | 9/1962 | Paine, II | ......................... | 137/85 |
| 3,072,326 A * | 1/1963 | Rohmann et al. | ...... | 235/200 WB |
| 3,171,330 A * | 3/1965 | McCombs, Jr. | ................. | 91/385 |
| 3,215,346 A * | 11/1965 | Alberani | ............... | 235/200 WB |
| 3,293,847 A * | 12/1966 | McCombs, Jr. et al. | ... | 60/39.281 |
| 3,393,606 A * | 7/1968 | Magnani et al. | .................. | 91/47 |
| 3,646,762 A * | 3/1972 | Hawk et al. | ..................... | 60/204 |
| 3,713,366 A * | 1/1973 | McCombs, Jr. | .................. | 91/47 |
| 3,748,454 A * | 7/1973 | Grier | ..................... | 235/200 WB |
| 4,265,272 A * | 5/1981 | Klimowicz et al. | ...... | 137/625.62 |
| 4,334,406 A * | 6/1982 | Todd | .............................. | 60/223 |
| 4,473,053 A * | 9/1984 | Shinoda | ....................... | 123/502 |
| 4,718,635 A | 1/1988 | de Concini et al. | | |
| 5,245,967 A * | 9/1993 | Reuter | ........................ | 123/359 |
| 6,273,135 B1 * | 8/2001 | Loxley | ..................... | 137/625.62 |
| 6,755,205 B1 * | 6/2004 | Hoemke et al. | ................. | 137/82 |
| 7,647,776 B1 * | 1/2010 | Smith | ............................ | 60/764 |
| 2004/0119039 A1 * | 6/2004 | Nierniro et al. | ............ | 251/129.2 |

* cited by examiner

*Primary Examiner* — John K Fristoe, Jr.
*Assistant Examiner* — Marina Tietjen
(74) *Attorney, Agent, or Firm* — Ingrassia Fisher & Lorenz, P.C.

(57) ABSTRACT

A torque balance servo is provided for use in conjunction with a fluidly-controlled device. The torque balance servo includes a pivoting table assembly and an electromagnetic force bias mechanism. The pivoting table assembly includes: (i) a pivoting table configured to pivot about a rotational axis, and (ii) a roller assembly mechanically coupled to the fluidly-controlled device and contacting a surface of the pivoting table. The electromagnetic force bias mechanism is disposed proximate the pivoting table assembly and configured to exert a variable torsional force about the rotational axis of the pivoting table.

19 Claims, 5 Drawing Sheets

TORQUE BALANCE SERVO INCLUDING ELECTROMAGNETIC FORCE BIAS MECHANISM

TECHNICAL FIELD

The present invention relates generally to a control servo and, more particularly, to a torque balance servo including an electromagnetic force bias mechanism suitable for use in conjunction with a fluidly-controlled device, such as a fuel metering valve.

BACKGROUND

Control servomechanisms are commonly utilized in conjunction with a wide variety of fluidly-controlled devices, such as pneumatic cylinders, hydraulic cylinders, fuel metering valves, and the like. One known control servomechanism, commonly referred to as a "force balance servo" or a "nut cracker servo" and referred to herein as a "torque balance servo," includes a roller assembly that is mechanically linked to a translatable piston mounted in the fluidly-controlled device. The roller assembly contacts and exerts a force on a pivoting table. Although normally residing in a null position, the pivoting table may pivot about a rotational axis when the forces biasing the pivoting table to rotate in a first direction (e.g., clockwise) exceed those biasing the table to rotate in the opposite direction (e.g., counter-clockwise). The pivoting table is positioned near an outlet nozzle, which is fluidly coupled to a variable-pressure chamber provided in the fluidly controlled device. As the pivoting table pivots about its rotational axis, a cap attached to the pivoting table selectively impedes fluid flow through the outlet nozzle. When the cap resides adjacent the outlet nozzle and substantially impedes fuel flow therethrough, the pressure within the variable-pressure chamber increases. Conversely, when the cap resides further away from the outlet nozzle and does not substantially impede fuel flow, the pressure within the variable-pressure chamber decreases. The translational position of the piston is generally determined by the pressure within the variable-pressure chamber and, thus, the angular position of the pivoting table. After the translational position of the piston has been adjusted in this manner, the torques exerted about the rotational axis of the pivoting table again reach a state of equilibrium and the pivoting table returns to the null position.

Conventionally, torque balance servos of the type described above utilize a mechanical force bias mechanism to temporarily adjust the angular position of the pivoting table and, therefore, the translational position of the piston contained within the fluidly-controlled device (e.g., the piston of a fuel metering valve). Such systems are traditionally mechanical in nature with the piston following the mechanical input in a known and consistent relationship returning to the null position after motion ceases.

In traditional systems requiring electrical input, the electrical input relationship to position or velocity of the output device (e.g., the piston of a fuel metering valve) depends on a varying gap in a torque motor, a proportional solenoid, or other such device that controls flow to the output device. These devices generally fail to provide a consistent relationship between the current applied to the position or velocity of the translatable piston within the fluidly-controlled device because consistent relationship between current and gap width cannot be maintained from unit to unit or over wide variations in temperature. Although an electrical feedback transducer (e.g., linear variable differential transducer) may be employed to continually monitor piston position and thus compensate for servo inconsistencies, the provision of such a feedback transducer adds undesirable cost, weight, and complexity to the system.

Considering the above, it would be desirable to provide a torque balance servo that achieves a highly accurate current-to-position output without the use of an electrical feedback transducer. Preferably, such a torque balance servo would maintain the accuracy of the current-to-position output over a relatively wide range of operating temperatures. Other desirable features and characteristics of the present invention will become apparent from the subsequent Detailed Description and the appended claims, taken in conjunction with the accompanying drawings and this Background.

BRIEF SUMMARY

A torque balance servo is provided for use in conjunction with a fluidly-controlled device. The torque balance servo includes a pivoting table assembly and an electromagnetic force bias mechanism. The pivoting table assembly includes: (i) a pivoting table configured to pivot about a rotational axis, and (ii) a roller assembly mechanically coupled to the fluidly-controlled device and contacting a surface of the pivoting table. The electromagnetic force bias mechanism is disposed proximate the pivoting table assembly and configured to exert a variable torsional force about the rotational axis of the pivoting table.

BRIEF DESCRIPTION OF THE DRAWINGS

At least one example of the present invention will hereinafter be described in conjunction with the following figures, wherein like numerals denote like elements, and.

DETAILED DESCRIPTION

The following Detailed Description is merely exemplary in nature and is not intended to limit the invention or the application and uses of the invention. Furthermore, there is no intention to be bound by any theory presented in the preceding Background or the following Detailed Description.

Figure 1:
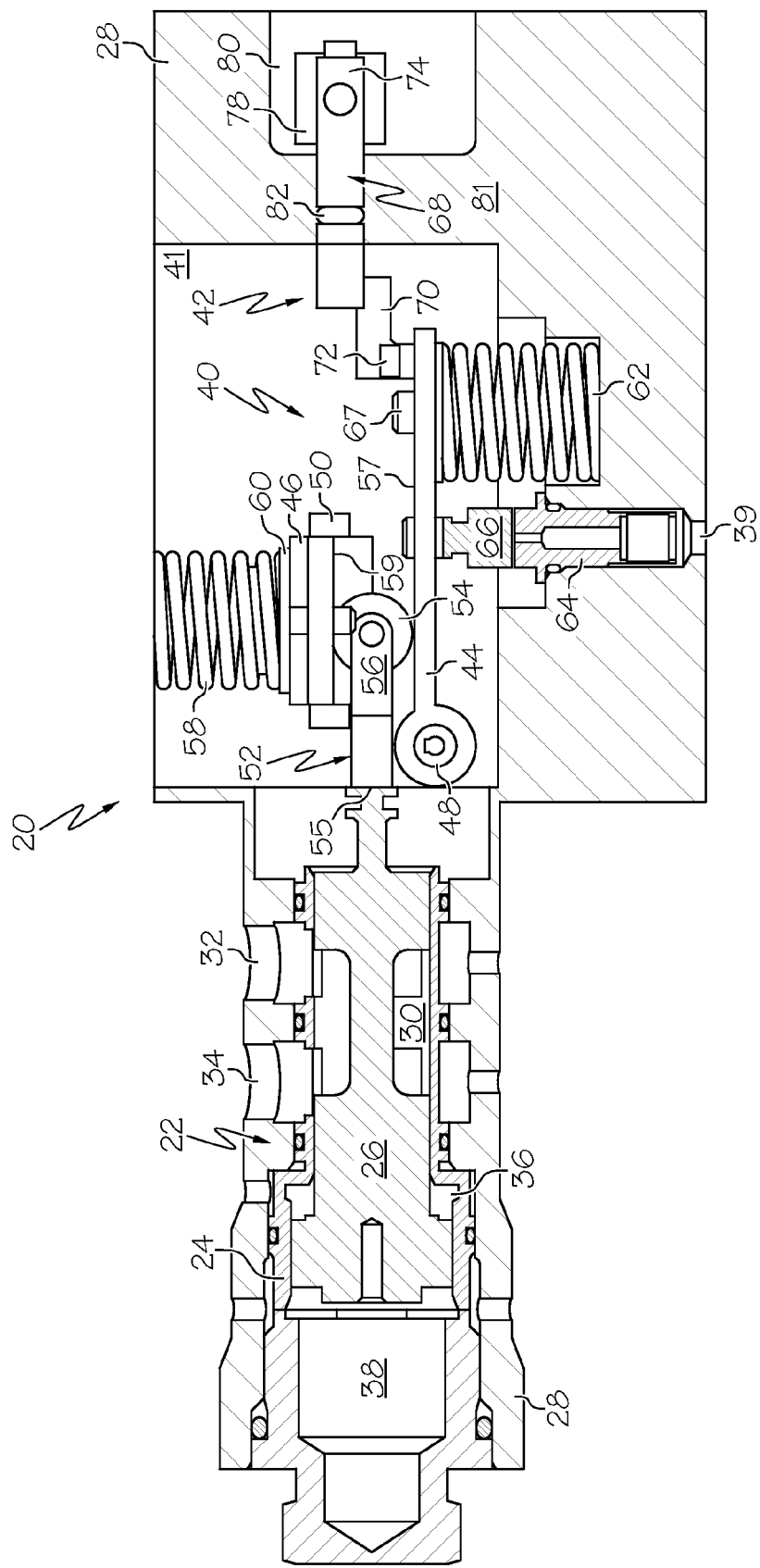
FIGS. 1 and 2 are side cross-sectional and isometric views, respectively, of a force balance servo and a fuel metering valve in accordance with an exemplary embodiment.
Figure 2:
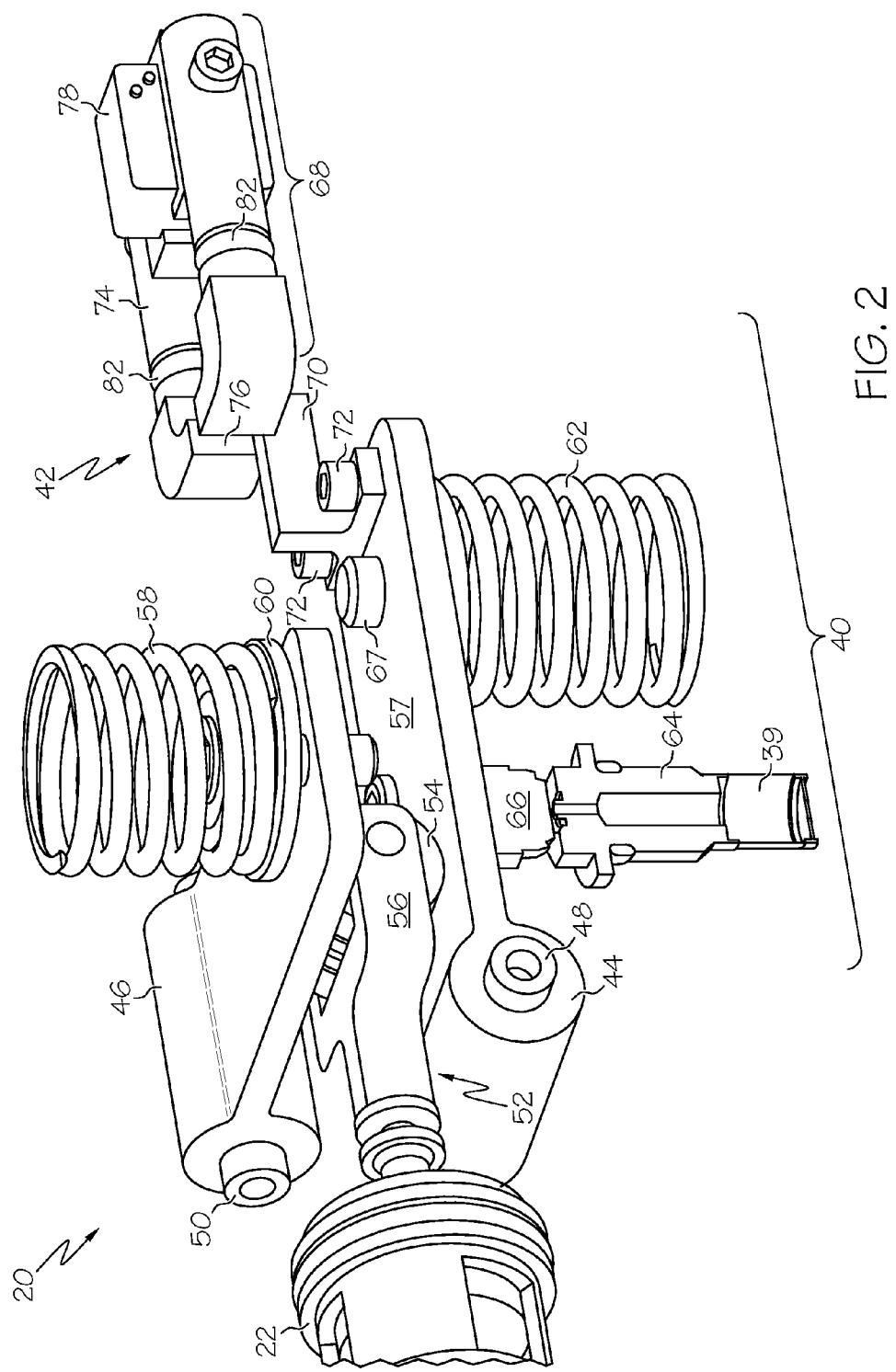

FIGS. 1 and 2 are side cross-sectional and isometric views, respectively, of a torque balance servo 20 (also commonly referred to as a "force balance servo") in accordance with an exemplary embodiment of the present invention. Torque balance servo 20 is suitable for use in conjunction with a wide variety of fluidly-controlled devices; however, for purposes of illustration, the following will describe torque balance servo 20 in conjunction with an exemplary fuel metering valve 22. Referring initially to FIG. 1, fuel metering valve 22 includes a metering valve piston 26 that is slidably mounted within a housing sleeve 24, which is, in turn, sealingly mounted within a main housing 28. A fuel flow passage 30 is formed through housing sleeve 24, metering valve piston 26, and main housing 28 and includes a fuel inlet port 32 and a fuel outlet port 34. Fuel flow passage 30 is also defined by additional features (e.g., an exponential metering port) that are well-known and not shown in FIG. 1 for clarity. Metering valve piston 26 cooperates with housing sleeve 24 to define two hydraulic chambers within fuel metering valve 22, namely, a constant-pressure chamber 36 and a variable-pressure chamber 38. Constant-pressure chamber 36 is fluidly coupled to an external source of pressure (not shown) that maintains the pressure within chamber 36 near a predetermined value. Variable-pressure chamber 38 is fluidly coupled to torque balance servo 20 by way of a pressurized flow passage 39 (only partially shown in FIG. 1). During operation of fuel metering valve 22, torque balance servo 20 selectively adjusts the pressure within variable-pressure chamber 38 to control the translational position of fuel metering piston 26 and, therefore, the rate of fuel flow through flow passage 30 as will be described more fully below in conjunction with FIG. 4.

Torque balance servo 20 comprises two primary assemblies or devices: (i) a pivoting table assembly 40, and (ii) an electromagnetic force bias mechanism 42. Pivoting table assembly 40 includes a pivoting table 44 and a pivoting rail 46, which may be positioned above pivoting table 44 as shown in FIG. 1. Pivoting table 44 and pivoting rail 46 are each disposed within a main cavity 41 provided in main housing 28. More specifically, pivoting table 44 and pivoting rail 46 are rotatably mounted within a main cavity 41 utilizing first and second pins 48 and 50, respectively. The longitudinal axes of pins 48 and 50, and thus the rotational axes of pivoting table 44 and pivoting rail 46, are preferably substantially perpendicular. Pivoting table assembly 40 further comprises a roller assembly 52 that includes a rod 56 having a roller 54 rotatably attached to a first end thereof. Roller 54 is disposed between pivoting table 44 and pivoting rail 46 such that an upper portion of roller 54 contacts a first substantially planar contact surface 57 of pivoting table 44 and a lower portion of roller 54 contacts a second substantially planar contact surface 59 of pivoting rail 46. A second end of rod 56 is mechanically coupled to metering valve piston 26. One or more intermediary linkages may be utilized to mechanically couple the second end of rod 56 to piston 26. Alternatively, and as indicated in FIG. 1 at 55, the second end of rod 56 may be connected directly to metering valve piston 26. As metering valve piston 26 translates within housing sleeve 24, roller assembly 52 moves relative to pivoting table 44 and pivoting rail 46 and roller 54 rolls along contact surfaces 57 and 59. Although roller assembly 52 is illustrated in FIGS. 1 and 2 as comprising a single roller 54, it will be appreciated that roller assembly 52 may include multiple rollers, each of which may travel along a separate track provided on contact surface 57 of pivoting table 44.

Referring still to FIG. 1, a spring 58 is compressed between an inner structure of housing 28 and a retainer member 60 fixedly coupled to pivoting rail 46 by way of, for example, a fastener. Collectively, spring 58 and pivoting rail 46 exert a bias force on roller 54, which, in turn, exerts a bias force on pivoting table 44. The bias force exerted by roller 54 on pivoting table 44 results in a torsional force being applied about the rotational axis of pivoting table 44. Considering pivoting table 44 as a lever arm, it should be appreciated that the magnitude of this torsional force applied is dependent upon the distance between roller 54 and the longitudinal axis of pin 34 (the fulcrum of the lever arm), as taken along longitudinal axis of pivoting table 44. In a preferred embodiment, spring 58 and pivoting rail 46 cooperate to apply a substantially constant bias force on roller 54. As a result, the force exerted by roller 54 on pivoting table 44, and thus the torsional force exerted about the rotational axis of pivoting table 44, varies in direct proportion to the relative position of roller 54. A second spring 62 is compressed between an internal structure of housing 28 and a second retaining member 67 fixedly coupled to pivoting table 44. Spring 62 exerts a bias force on pivoting table 44 opposing that exerted by spring 58, pivoting rail 46, and roller 54.

In addition to the above-described components, pivoting table assembly 40 further includes an outlet nozzle 64 and a cap 66. As noted above, outlet nozzle 64 is fluidly coupled to variable-pressure chamber 38 by way of pressurized flow passage 39 (again, only partially shown in FIGS. 1 and 2). Cap 66 is fixedly mounted to a surface of pivoting table 44 substantially opposite contact surface 57. A pressure relief gap separates cap 66 from outlet nozzle 64. As pivoting table 44 pivots about its rotational axis, the width of the pressure relief gap increases or decreases. For example, and with reference to FIG. 1, when pivoting table 44 pivots about its rotational axis in a counter-clockwise direction, the width of the pressure relief gap increases. Conversely, when pivoting table 44 pivots about its rotational axis in a clockwise direction, the width of the pressure relief gap decreases. When the width of the pressure relief gap is relatively large (i.e., when the angular position of table 44 is such that cap 66 is relatively far away from outlet nozzle 64), cap 66 does not substantially obstruct fuel flow through outlet nozzle 64 and into main cavity 41. In contrast, when the width of the pressure relief gap is relatively small (i.e., when the angular position of table 44 is such that cap 66 is relatively close to outlet nozzle 64), cap 66 largely obstructs fuel flow through outlet nozzle 64 and into main cavity 41. Cap 66 is illustrated as a discrete body in FIGS. 1 and 2; however, in alternative embodiments, cap 66 may be integrally formed with pivoting table 44 (e.g., cap 66 may simply comprise a surface of pivoting table 44 that may selectively cove outlet nozzle 64).

Electromagnetic force bias mechanism 42 is the second primary device employed in torque balance servo 20. Electromagnetic force bias mechanism 42 resides proximate pivoting table assembly 40 and is configured to exert a variable torsional force about the rotational axis of pivoting table 44 as described more fully below. Referring collectively to FIGS. 1 and 2, electromagnetic force bias mechanism 42 comprises an electromagnet 68 and a magnetically-permeable body 70, which is disposed adjacent electromagnet 68. Magnetically-permeable body 70 is preferably formed from a high mu material, such as a nickel-iron alloy. Magnetically-permeable body 70 is fixedly mounted to an end portion of pivoting table 44 via one or more fasteners 72 (e.g., bolts); however, in alternative embodiments, magnetically-permeable body 70 may be fixedly coupled to other portions of pivoting table 44 or another structure coupled to pivoting table 44 utilizing other attachment means (e.g., soldering or welding). As a still further alternative, magnetically-permeable body 70 may be incorporated into (e.g., integrally formed with) pivoting table 44.

In the illustrated example, electromagnet 68 comprises a magnetically-permeable core 74 and a control coil housing 78. Control coil housing 78 is attached to magnetically-permeable core 74 and contains one or more control coils as described below in more detail in conjunction with FIG. 3. As shown in FIG. 1, control coil housing 78 is disposed within a secondary cavity 80 provided in main housing 28 and partitioned from main cavity 41 by an inner wall 81. Mounting control coil housing 78 in this manner decreases the likelihood of exposure occurring between the control coils contained within housing 78 and the fuel within cavity 41. To further prevent the ingress of fuel into secondary cavity 80, one or more static (e.g., air-liquid pressure) seals 82 may be disposed around core 74 and sealingly engage an internal surface of wall 81.

Figure 3:
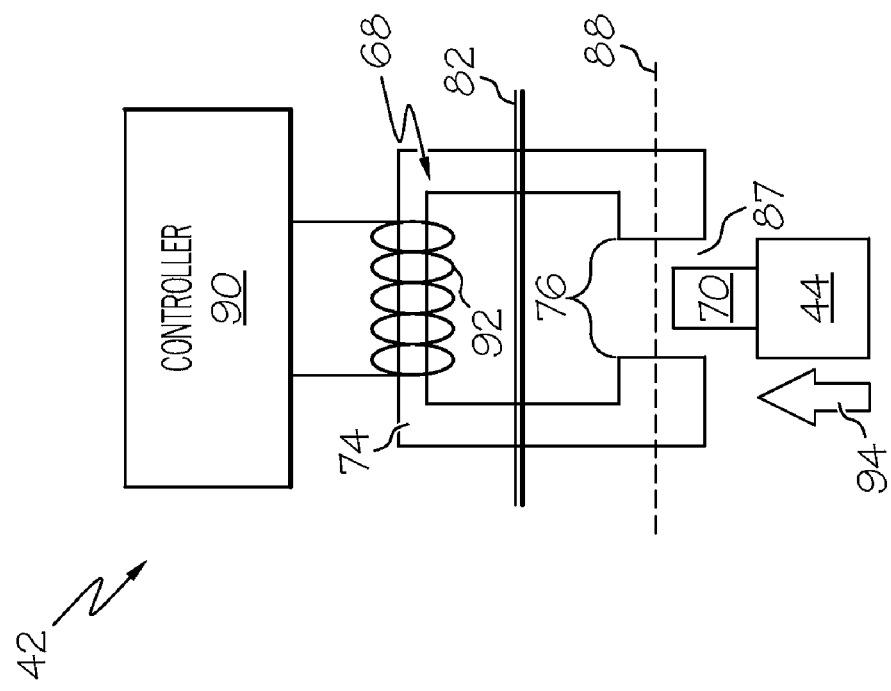
FIG. 3 is a functional end view of the electromagnetic force bias mechanism employed by the exemplary force balance servo shown in FIGS. 1 and 2.

FIG. 3 is a functional end view of exemplary electromagnetic force bias mechanism 42 and pivoting table 44. Magnetically-permeable core 74 comprises a body including: (i) a first core portion around which one or more control coils 92 are disposed, and (ii) a second core portion residing proximate magnetically-permeable body 70. Again, one or more static seals 82 may be disposed between the first core portion and the second core portion for the reasons explained above. In the exemplary embodiment illustrated in FIG. 3, the first core portion assumes the form of an intermediate segment and the second core portion assumes the form of first and second elongated arms, which extend from the intermediate segment toward pivoting table 44. A slot 76 is formed in the second core portion sufficient to accommodate magnetically-permeably body 70. That is, the width of slot 76 may be slightly greater than the width of magnetically-permeable body 70 such that the sidewalls of slot 76 are separated from the sidewalls of body 70 by a relatively small gap 87. The width of gap 87, which is exaggerated in FIG. 3 for clarity, is preferably on the order of a few thousands of an inch. In a preferred embodiment, the width of slot 76 exceeds that of magnetically-permeably body 70 by no more than about 0.001 inch to about 0.005 inch.

Referring still to FIG. 3, a controller 90 is operatively coupled to control coils 92 of electromagnet 68. Controller 90 is configured to selectively apply an electrical current to control coils 92 so as to induce a magnetic field proximate slot 76. Pivoting table 44 normally resides in the null position shown in FIGS. 1-3. In the null position, magnetically-permeable body 70 resides proximate, but is offset from, the center of slot 76 (represented by dashed centerline 88 in FIG. 3). When controller 90 applies an electrical current to control coils 92, the flux density of the induced magnetic field is greatest within slot 76 along centerline 88. The magnetic field thus attracts magnetically-permeable body 70 toward alignment with centerline 88. A bias force is consequently applied to pivoting table 44 in the direction indicated by arrow 94, and a torsional force is applied about the rotational axis of pivoting table 44 in a counter-clockwise direction. As will be described below in conjunction with FIG. 4, controller 90 continually manipulates the electrical current supplied to control coils 92 to control the degree to which electromagnet 68 attracts magnetically-permeable body 70 and, thus, the torsional force applied by electromagnetic force bias mechanism 42 about the rotational axis of pivoting table 44.

Figure 4:
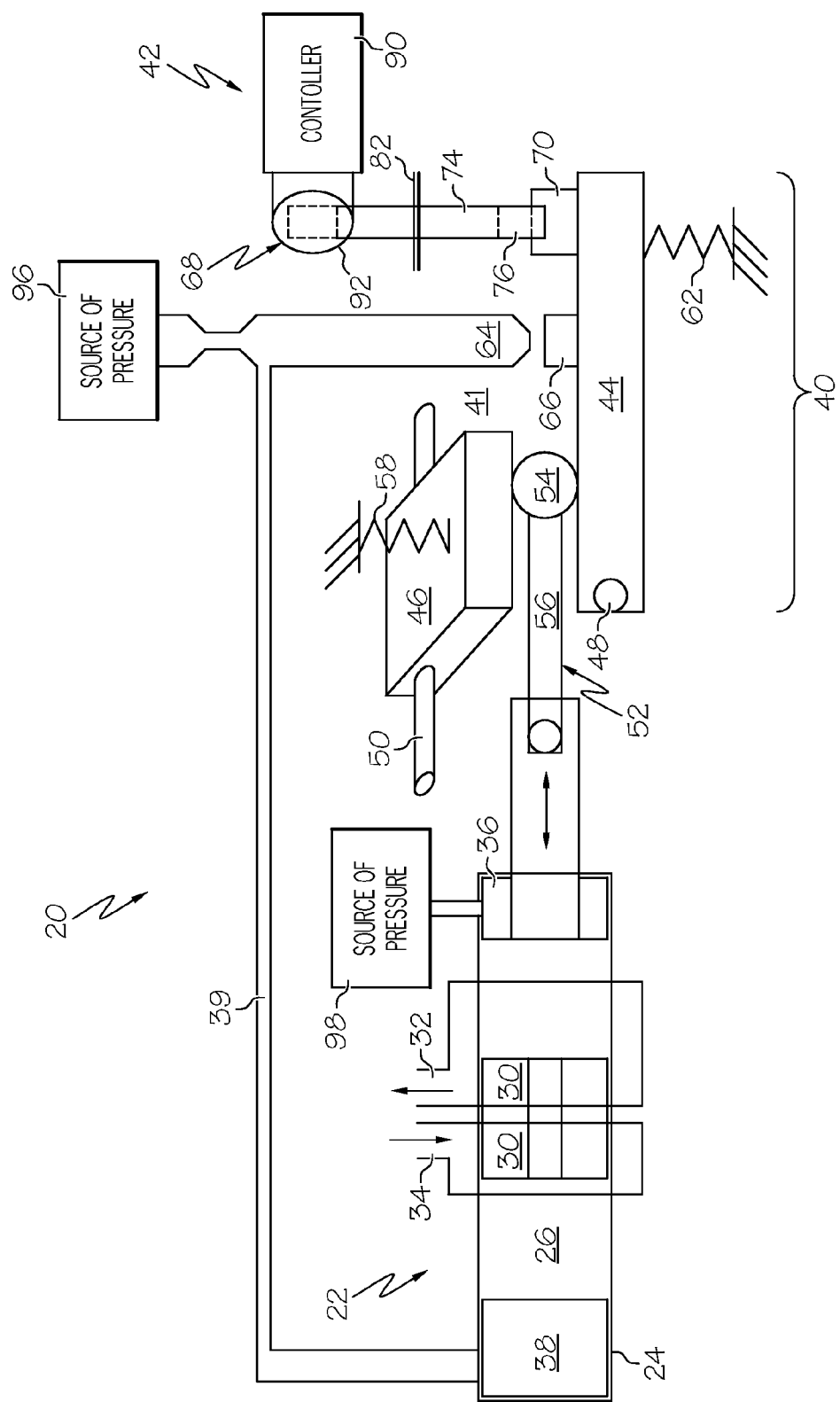
FIG. 4 is a functional schematic of the force balance servo and fuel metering valve shown in FIGS. 1 and 2.

FIG. 4 is a functional schematic of exemplary torque balance servo 20 useful for explaining the manner in which exemplary electromagnetic force bias mechanism 42 and the other components of torque balance servo 20 operate. It can be seen in FIG. 4 that pressurized flow passage 39 is fluidly coupled between variable-pressure chamber 38 and outlet nozzle 64 and, also, that a first source of pressure 96 is fluidly coupled to pressurized flow passage 39. It can further be seen in FIG. 4 that a second source of pressure 98 is fluidly coupled to constant-pressure chamber 36 of fuel metering valve 22. Second source of pressure 98 maintains the pressure within constant-pressure chamber 36 at or near a predetermined value. As previously explained, the pressure within variable-pressure chamber 38 is determined by the width of the pressure relief gap (i.e., distance between outlet nozzle 64 and cap 66) and, thus, the angular position of pivoting table 44.

When the cumulative torques exerted about the rotational axis of pivoting table 44 are balanced (i.e., the when the torques biasing table 44 in a first rotational direction are equivalent to those biasing table 44 in the opposite rotational direction), pivoting table 44 resides in the null position shown in FIGS. 1-4. When it is desirable to increase or decrease the rate of fuel flow through fuel metering valve 22, controller 90 varies the current supplied to electromagnet 68 and, thus, the strength of the magnetic field generated by electromagnet 68. For example, controller 90 may increase the current supplied to electromagnet 68 to increase the strength of the induced magnetic field. This results in an increase in the force biasing magnetically-permeable body 70 toward alignment with slot 76 (shown in phantom in FIG. 4), which causes pivoting table 44 to pivot in the counterclockwise direction. The change in the angular position of pivoting table 44 further results in a decrease in the width of the pressure relief gap. A greater portion of the pressurized fuel supplied by source of pressure 96 is directed into variable-pressure chamber 38, and the pressure within chamber 38 consequently increases. When the pressure exerted on metering valve piston 26 by the fuel within variable-pressure chamber 38 exceeds that exerted on piston 26 by the fuel within constant-pressure chamber 36 and main cavity 41, piston 26 moves toward constant-pressure chamber 36 (to the right in FIG. 4) and fuel flow through fuel metering valve 22 decreases. As piston 26 moves toward constant-pressure chamber 36, roller 54 moves away from pin 48. This causes a corresponding increase in the torsional force exerted about the rotational axis of pivoting table 44 by spring 58, pivoting rail 46, and roller 54. Piston 26 continues to move toward constant-pressure chamber 36, and roller 54 continues to move away from pin 48, until the torsional forces exerted about the rotational axis of pivoting table 44 again become balanced and pivoting table 44 returns to the null position shown in FIGS. 1-4.

The above-described process is repeated as desired to decrease the fuel flow through fuel metering valve 22 in a controlled manner. To increase the fuel flow through fuel metering valve 22, the opposite process is performed. That is, controller 90 decreases the current supplied to electromagnet 68, the bias force exerted about the rotational axis of pivoting table 44 by electromagnetic force bias mechanism 42 decreases, pivoting table 44 pivots in the clockwise direction, the width of the pressure relief gap increases, and the pressure within variable-pressure chamber 38 decreases. When the force exerted on metering valve piston 26 by fuel within variable-pressure chamber 38 is exceeded by the force exerted on piston 26 by the fuel within constant-pressure chamber 36 and main cavity 41, piston 26 moves toward variable-pressure chamber 38 (to the left in FIG. 4) and fuel flow through flow passage 30 increases. As piston 26 moves toward variable-pressure chamber 38, roller 54 moves toward pin 48 thus causing a corresponding decrease in the torsional force exerted about the rotational axis of pivoting table 44 by spring 58, pivoting rail 46, and roller 54. Piston 26 continues to move toward variable-pressure chamber 38 until the torsional forces exerted about pin 48 again reach a state of equilibrium and pivoting table 44 returns to the null position.

In the illustrated exemplary embodiment, and as may be most easily appreciated by referring to FIG. 3, the width of gap 87 remains constant irregardless of the particular position of magnetically-permeable body 70 within slot 76. Similarly, when pivoting table 44 resides in the null position (shown in FIGS. 1-4), the distance between magnetically-permeable body 70 and centerline 88 also remains constant. Thus, when pivoting table 44 resides in the null position, the torsional force exerted about pin 48 by electromagnetic force bias mechanism 42 varies as a relatively basic function of the current supplied to control coils 92.

There has thus been described an exemplary torque balance servo that may be utilized to control a fluidly-controlled device, such as a fuel metering valve. Advantageously, the above-described torque balance servo achieves a consistent and accurate current-to-position output (i.e., controller 90 is able control the translation position of piston 26 with a high degree of accuracy by simply varying the current supplied to electromagnet 68) without the use of an electrical feedback transducer. As an additional advantage, torque balance servo 20 exhibits a relatively high gain and is consequently less sensitive to frictional losses. Notably, torque balance servo 20 may be configured to permit calibration in a number of different manners. For example, servo 20 may be configured such that electromagnet 68 is movable with respect to magnetically-permeable body 70. In addition, the characteristics of spring 58 may be chosen to yield a desired span of movement for pivoting rail 46. Similarly, the characteristics of spring 62 may be chosen to produce a desired null position for pivoting table 44.

Figure 5:
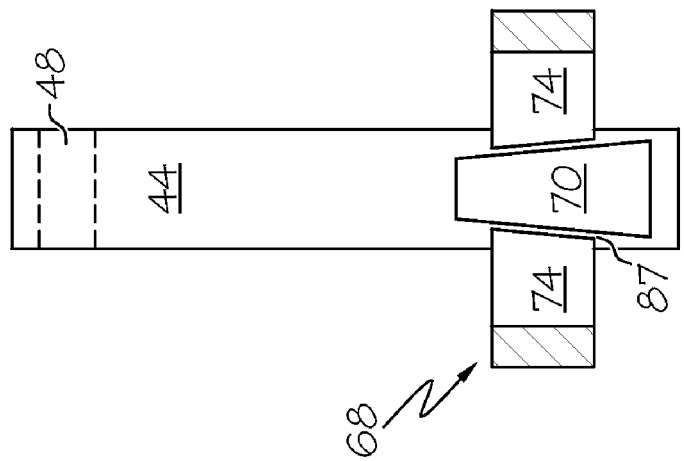
FIG. 5 is a top cutaway view of the electromagnetic force bias mechanism and the pivoting table employed by the exemplary force balance servo shown in FIGS. 1, 2, and 4.

During operation, torque balance servo 20 may experience relatively high temperatures sufficient to cause the thermal expansion of pivoting table 44. As pivoting table 44 thermally expands, the distance between magnetically-permeable body 70 and pin 48 increases. When the width of gap 87 is held constant, the torsional force exerted about the rotational axis of pivoting table 44 by electromagnet 68 increases with the thermal expansion of pivoting table 44. In the illustrated exemplary embodiment shown in FIG. 5 (a top cutaway view of pivoting table 44, magnetically-permeable body 70, and core 74, it can be seen that electromagnet and magnetically-permeable body 70 are shaped such that the sidewalls slot 76 and the sidewalls of body 70 converge with increasing proximity to pin 48. As the length of pivoting table 44 increases due to thermal expansion, the width of gap 87 will also increase. This increase in the width of gap 87 results in a decrease in the bias force exerted on magnetically-permeable body 70 by electromagnet 68 that generally compensates for the increase in bias force resulting from the thermal expansion of pivoting table 44.

Figure 6:
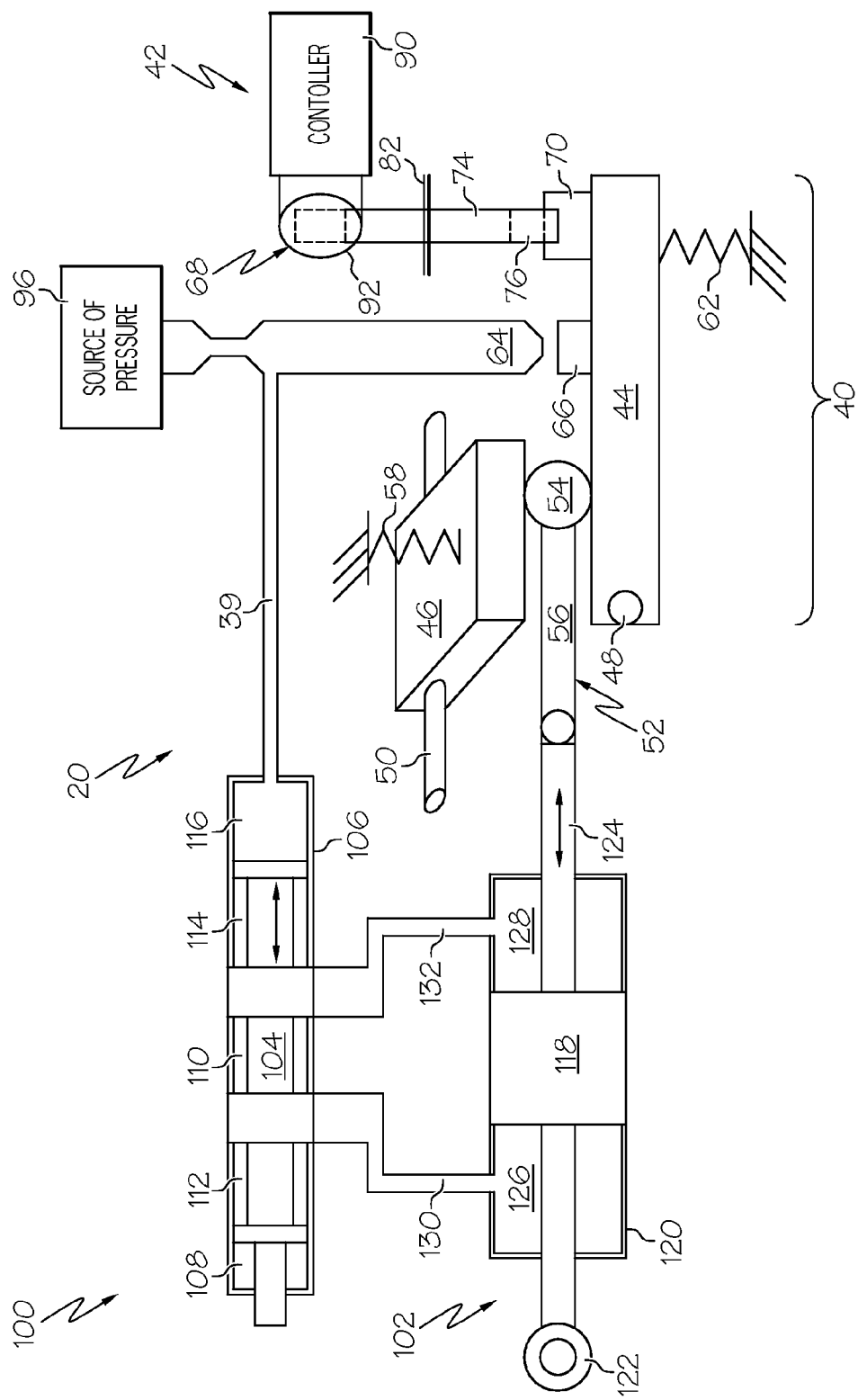
FIG. 6 is a functional schematic of a force balance servo and hydraulic cylinder in accordance with a second exemplary embodiment.

Although foregoing has thus described an exemplary torque balance servo in conjunction with a fuel metering valve, the embodiments of the torque balance servo may be utilized with various other pneumatic and hydraulic devices. To further illustrate this point, FIG. 6 provides a functional schematic view of torque balance servo 20 employed in conjunction with a dual stage spool valve 100 and a hydraulic piston assembly 102. In this illustrated exemplary embodiment, dual stage spool valve 100 comprises a translatable spool valve piston 104 slidably disposed within a housing sleeve 106. Piston 104 and housing sleeve 106 cooperate to define high pressure chambers 108 and 110, low pressure chambers 112 and 114, and a variable-pressure chamber 116 within dual stage spool valve 100. High pressure chambers 108 and 110 are fluidly coupled to a high pressure source (not shown), which maintains the fluid within chambers 108 and 110 at a relatively high pressure; low pressure chambers 112 and 114 are fluidly coupled to a low pressure source (also not shown) that maintains the fluid within chambers 112 and 114 at a relatively low pressure; and variable-pressure chamber 116 is fluidly coupled to outlet nozzle 64 and source of pressure 96 via pressurized flow passage 39. Hydraulic piston assembly 102 comprises a translatable piston 118 mounted in a housing sleeve 120. Translatable piston 118 incudes a first end 122, which serves as a mechanical output, and a second end 124, which is mechanically coupled to rod 56 of roller assembly 52. Piston 118 and housing sleeve 120 cooperate to define first and second hydraulic piston chambers 126 and 128 within hydraulic piston assembly 102. As shown in FIG. 6, hydraulic piston chambers 126 and 128 are fluidly coupled to dual stage spool valve 100 via first and second ducts 130 and 132, respectively.

As was the case previously, torque balance servo 20 functions to adjust the pressure within a variable-pressure chamber to control the operation of a fluidly-controlled device. In this particular case, torque balance servo 20 functions to adjust the pressure within variable-pressure chamber 116 to control the position of spool valve piston 104 and, therefore, the operation of hydraulic piston assembly 102. For example, torque balance servo 20 may increase the pressure within variable-pressure chamber 116 to cause spool valve piston 104 to move away from variable-pressure chamber 116 (to the left in FIG. 6). When spool valve piston 104 is moved in this manner, pressurized fluid flows from high pressure chamber 110, through duct 130, and into hydraulic piston chamber 126. At the same, fluid is permitted to flow from hydraulic piston chamber 128, through duct 132, and into low pressure chamber 114. The force exerted on piston 118 by the fluid within hydraulic piston chamber 126 consequently exceeds that exerted on piston 118 by the fluid within hydraulic piston chamber 128, and piston 118 moves toward chamber 128 (to the right in FIG. 6). By utilizing a dual stage spool valve in this manner, torque balancer servo 20 is able to rapidly adjust the translational position of a relatively large hydraulic (or pneumatic) piston with a relatively high degree of accuracy. Although not shown in FIG. 6, a feedback mechanism may mechanically link spool valve piston 104 to rod 56 for increased stability.

There has thus been provided at least one exemplary embodiment of a torque balance servo that is able to achieve a high accuracy current-to-position output without the use of an electrical feedback transducer. Although described above with reference to a specific exemplary embodiment, the electromagnetic force bias mechanism may comprise any electromagnetic device (e.g., a solenoid) suitable for applying a magnetic force to the pivoting table that manifests as a torsional force about the pivoting table's rotational axis. Furthermore, the electromagnetic force bias mechanism may exert this magnetic force on any magnetically-permeable structure fixedly coupled to the pivoting table (e.g., magnetically-permeable body 70, pin 48, etc.) or any magnetically-permeable portion of the pivoting table.

While at least one exemplary embodiment has been presented in the foregoing Detailed Description, it should be appreciated that a vast number of variations exist. It should also be appreciated that the exemplary embodiment or exemplary embodiments are only examples, and are not intended to limit the scope, applicability, or configuration of the invention in any way. Rather, the foregoing Detailed Description will provide those skilled in the art with a convenient road map for implementing an exemplary embodiment of the invention. It being understood that various changes may be made in the function and arrangement of elements described in an exemplary embodiment without departing from the scope of the invention as set-forth in the appended claims.

What is claimed is:

1. A torque balance servo for use in conjunction with a fluidly-controlled device, the torque balance servo comprising:
   a pivoting table assembly, comprising:
      a pivoting table configured to pivot about a rotational axis and normally residing in a null position; and a roller assembly mechanically coupled to the fluidly-controlled device and contacting a surface of the pivoting table with a normal load; and an electromagnetic force bias mechanism disposed proximate the pivoting table assembly and configured to exert a variable torsional force about the rotational axis of the pivoting table to provide controlled pivoting of the pivoting table, the roller assembly readjusting its position in response to pivoting movement of the pivoting table such that the torque from the normal load applied through the roller assembly counteracts and balances torque applied to the pivoting table by the varying electromagnetic force to return the pivoting table to the null position after pivoting movement thereof.

2. A torque balance servo according to claim 1 wherein the electromagnetic force bias mechanism comprises:

an electromagnet disposed proximate the pivoting table and configured to generate a magnetic field that acts on the pivoting table to produce a torsional force about the rotational axis; and a controller operatively coupled to the electromagnet, the controller configured to vary the current supplied to the electromagnet to adjust the torsional force exerted by the electromagnet about the rotational axis.

3. A torque balance servo according to claim 2 wherein the electromagnetic force bias mechanism comprises a magnetically-permeable body fixedly coupled to the pivoting table and disposed adjacent the electromagnet.

4. A torque balance servo according to claim 3 wherein the electromagnet comprises:

a magnetically-permeable core, comprising:
a first core portion passing through the control coil; and
a second core portion residing adjacent the magnetically-permeable body; and a control coil disposed around the first core portion and operatively coupled to the controller.

5. A torque balance servo according to claim 4 wherein the electromagnetic force bias mechanism further comprises a seal disposed between the first core portion and the second core portion.

6. A torque balance servo according to claim 4 wherein the second core portion has a slot formed therein, the magnetically-permeable body normally residing proximate the slot.

7. A torque balance servo according to claim 6 wherein the width of the slot is greater than that of the magnetically-permeable body.

8. A torque balance servo according to claim 7 wherein the width of the slot exceeds the width of the magnetically-permeable body by no more than about 0.001 inch to about 0.005 inch.

9. A torque balance servo according to claim 6 wherein the pivoting table is configured to reside in a null position when the torsional forces exerted about the rotational axis are balanced, and wherein the magnetically-permeable body is offset from the center of the slot in the null position.

10. A torque balance servo according to claim 9 wherein the magnetically-permeable body resides at least partially within the slot in the null position.

11. A torque balance servo according to claim 6 wherein the sidewalls of the magnetically-permeable body converge with increasing proximity to the rotational axis of the pivoting table.

12. A torque balance servo according to claim 11 wherein the sidewalls of the slot converge with increasing proximity to the rotational axis of the pivoting table.

13. A torque balance servo according to claim 1 wherein fluidly-controlled device includes a variable-pressure chamber, and wherein the pivoting table assembly further comprises:

a pressurized flow passage fluidly coupled to the variable-pressure chamber;
an outlet nozzle fluidly coupled to the pressurized flow passage; and
a cap fixedly coupled to the pivoting table and disposed proximate the outlet nozzle, the cap configured to selectively impede flow through the outlet nozzle depending upon the angular position of the pivoting table.

14. A torque balance servo according to claim 1 wherein the pivoting table assembly further comprises:

a pivoting rail contacting the roller assembly; and
a first spring biasing the pivoting rail toward the roller assembly.

15. A torque balance servo according to claim 14 wherein the fluidly-controlled device includes a translatable piston, and wherein the roller assembly comprises:

a roller disposed between the pivoting rail and the pivoting table; and
a rod mechanically coupled between the roller and the translatable piston.

16. A torque balance servo for use in conjunction with a fluidly-controlled device containing a translatable piston, the torque balance servo comprising:

a housing;
a pivoting table assembly, comprising:
a pivoting table mounted in the housing for rotation about a rotational axis; and
a roller assembly mechanically coupled to the translatable piston and configured to roll along a surface of the pivoting table as the translatable piston translates within the fluidly-controlled device;

an electromagnetic force bias mechanism, comprising:
an electromagnet mounted in the housing and configured to exert a variable torsional force about the rotational axis of the pivoting table; and
a controller operatively coupled to the electromagnet, the controller configured to vary the current supplied to the electromagnet to adjust the torsional force exerted by the electromagnet about the rotational axis of the pivoting table;

wherein the electromagnet comprises:
an intermediate segment;
a control coil disposed around the intermediate segment and operatively coupled to the controller; and
first and second elongated arms extending from the intermediate segment toward the pivoting table.

17. A torque balance servo according to claim 16 further comprising a magnetically-permeable body fixedly coupled to the pivoting table assembly and disposed proximate the first and second elongated arms.

18. A torque balance servo according to claim 16 wherein the housing comprises:

a main cavity in which at least a portion of the pivoting table assembly is mounted;
a secondary cavity in which the intermediate segment of the electromagnet is mounted; and
an inner wall partitioning the main cavity from the secondary cavity, the first and second elongated arms extending through the inner wall.

19. A torque balance servo for use in conjunction with a fluidly-controlled device containing a translatable piston, the torque balance servo comprising:

a pivoting table assembly, comprising;

a pivoting table configured to pivot about a rotational axis and normally residing in a null position; and a roller assembly mechanically coupled to the fluidly-controlled device and contacting a surface of the pivoting table with a normal load; and an electromagnetic force bias mechanism, comprising:

a magnetically-permeable body fixedly coupled to the pivoting table;

an electromagnet disposed proximate the pivoting table assembly and configured for magnetic communication with the magnetically-permeable body; and a controller operatively coupled to the electromagnet, the controller configured to manipulate the magnet force exerted on the magnetically-permeable body by the electromagnet to adjust the torsional force exerted about the rotational axis of the pivoting table and provide controlled pivoting movement thereof, the roller assembly readjusting its position in response to pivoting movement of the pivoting table such that the torque from the normal load applied through the roller assembly counteracts and balances torque applied to the pivoting table by the varying electromagnetic force to return the pivoting table to the null position after pivoting movement thereof.

* * * * *